UNITED STATES PATENT OFFICE.

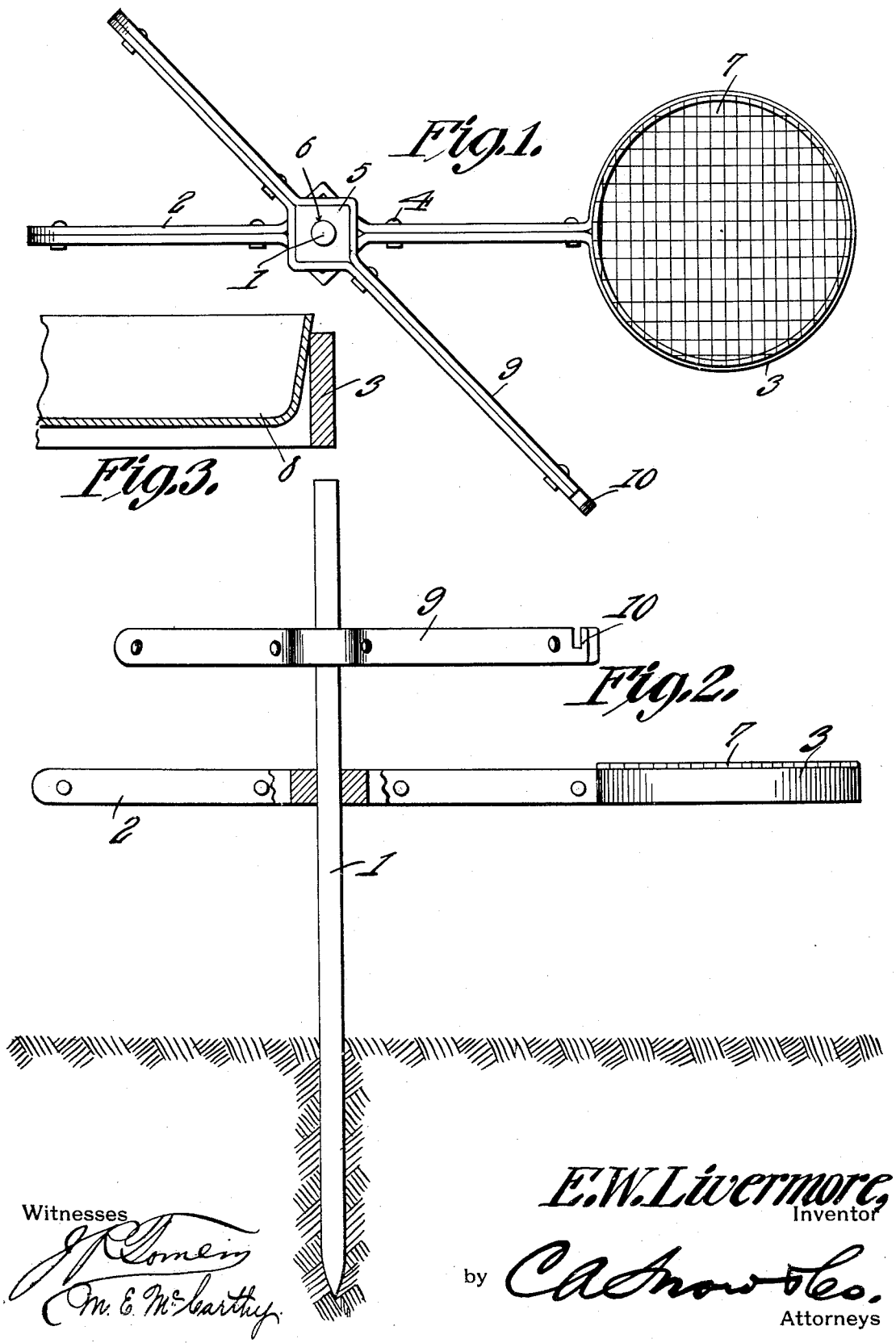

EPHRAIM W. LIVERMORE, OF BELLINGHAM, WASHINGTON.

CAMP-COOKER.

1,175,278.

Specification of Letters Patent.

Patented Mar. 14, 1916.

Application filed August 17, 1914. Serial No. 857,211.

*To all whom it may concern:*

Be it known that I, EPHRAIM W. LIVERMORE, a citizen of the United States, residing at Bellingham, in the county of Whatcom and State of Washington, have invented a new and useful Camp-Cooker, of which the following is a specification.

This invention relates to cookers or stoves for use in camps and the like, one of the objects of the invention being to provide means which can be set up readily over a fire and which serves to support kettles, pans and broilers over a fire, a portion of the said supporting means constituting a handle whereby the utensil mounted thereon can be conveniently removed from above the fire or placed in position.

A further object is to provide means for supporting the utensil and which means does not necessitate the use of set screws or other similar fastening devices.

A further object is to provide means for supporting utensils at any desired distances above the fire.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings, Figure 1 is a plan view of the device. Fig. 2 is a side elevation thereof, a portion being shown in section. Fig. 3 is an enlarged section through a portion of the holding ring and showing a portion of a pan mounted therein.

Referring to the figures by characters of reference 1 designates a metal stake of any suitable proportions adapted to be driven into the ground as shown and constituting the supporting means for the utensil holders. Any desired number of these utensil holders can be used and in the drawings two of them have been illustrated. One of these utensil holders is made up of a metal strap folded upon itself to form a shank 2 and a ring 3 at one end of the shank, the opposed portions of the strap forming the shank being held together by rivets 4 or the like. The shank 2 is enlarged at a point between its ends by securing a block 5 between the thicknesses of the shank, this block having a circular opening 6 designed to receive the stake 1. The ring 3 is designed to support various utensils such as a broiler 7 or a pan 8, the broiler being nothing more than a pan-shaped structure formed of a heavy metal fabric. Another form of holder has been illustrated at 9, this being particularly designed for supporting kettles and the like. This holder is similar to that before described, with the exception that instead of having a ring at one end, said end of the holder is formed with a hook 10.

In using the device, the stake 1 is driven into the ground close to the fire after which the holders are placed on the stake so as to support utensils above the fire. The weight of the utensils will cause the holders to bind upon the stake so that they will thus be held in any positions to which they might be adjusted along the stake. As shown particularly in Fig. 1, the two holders can be disposed at acute angles to each other so that while a pan or broiler is supported by the ring 3 above the fire, a kettle or the like can be supported by the hook 10 above the same fire. When it is desired to remove the food from above the fire, it is merely necessary to grasp the upper holder by that end of the shank 2 remote from the ring 3 and to then slide the holder upwardly off of the stake. As the part of the shank grasped in the hand is located at some distance from the fire, it will be apparent that the same will constitute an efficient handle because it will not be overheated. The lower holder can be removed in a similar manner.

What is claimed is:—

A device of the class described including a round stake, a metal strip having its intermediate portion bent to form a circular loop, said strip having opposed portions brought together and secured to form a handle extending radially from the loop, the said loop constituting means for receiving and supporting a utensil, the side portions of the strip being spaced apart at an intermediate point of the handle to form an
5 opening adapted to snugly receive the stake, said opening being located at a point between the ends of the handle.

In testimony that I claim the foregoing as my own, I have hereto affixed my signature in the presence of two witnesses.

EPHRAIM W. LIVERMORE.

Witnesses:
GLADY DANIEL,
C. S. NICHOLSON.